(12) United States Patent
Faber et al.

(10) Patent No.: US 6,519,570 B1
(45) Date of Patent: Feb. 11, 2003

(54) SYSTEM AND METHOD FOR CONDUCTING A TIME AUCTION

(75) Inventors: Scott Faber, San Francisco, CA (US); Sean Van der Linden, San Francisco, CA (US)

(73) Assignee: Keen.COM, Inc. A Corp. of CA., San Francisco, CA (US)

(*) Notice: Subject to any disclaimer, the term of this patent is extended or adjusted under 35 U.S.C. 154(b) by 0 days.

(21) Appl. No.: 09/565,587

(22) Filed: May 4, 2000

Related U.S. Application Data (63) Continuation of application No. 09/414,710, filed on Oct. 8, 1999.

(51) Int. Cl.[7] .............................................. G06F 17/60
(52) U.S. Cl. ..................... 705/8; 705/1; 705/8; 705/26; 705/27; 705/37
(58) Field of Search ................................ 705/26, 37, 1, 705/27, 8

(56) References Cited

U.S. PATENT DOCUMENTS

| | | | |
|---|---|---|---|
| 4,631,428 A | 12/1986 | Grimes | |
| 4,677,434 A | 6/1987 | Fascenda | |
| 4,723,283 A | 2/1988 | Nagasawa et al. | |
| 4,751,669 A | 6/1988 | Sturgis et al. | 364/900 |
| 5,058,152 A | 10/1991 | Solomon et al. | 379/67 |
| 5,148,474 A | 9/1992 | Haralambopoulos et al. | 379/111 |
| 5,319,542 A | 6/1994 | King, Jr. et al. | 364/401 |
| 5,325,424 A | 6/1994 | Grube | 379/94 |
| 5,347,632 A | 9/1994 | Filepp et al. | 395/200 |
| 5,359,508 A | 10/1994 | Rossides | 364/401 |
| 5,497,502 A | 3/1996 | Castille | |
| 5,537,314 A | 7/1996 | Kanter | 364/406 |
| 5,539,735 A | 7/1996 | Moskowitz | 370/60 |
| 5,555,298 A | 9/1996 | Jonsson | 379/207 |
| 5,557,677 A | 9/1996 | Prytz | |
| 5,590,197 A | 12/1996 | Chen et al. | 380/24 |
| 5,602,905 A | 2/1997 | Mettke | 379/96 |

(List continued on next page.)

FOREIGN PATENT DOCUMENTS

| | | | |
|---|---|---|---|
| GB | 2329046 A | | 10/1999 |
| JP | 409233441 A | | 9/1997 |
| JP | 409319812 A | | 12/1997 |
| KR | 20010162 | * | 3/2001 |
| WO | WO 97/05733 | | 2/1997 |
| WO | WO 98/02835 | | 1/1998 |
| WO | WO 98/04061 | | 1/1998 |
| WO | WO 98/13765 | | 4/1998 |
| WO | WO 98/38558 | | 9/1998 |
| WO | WO 200127825 | * | 4/2000 |
| WO | WO 200057326 | * | 9/2000 |
| WO | WO 200137112 | * | 5/2001 |

OTHER PUBLICATIONS

Smith, Vernon, L., "Experimental methods in the political economy of exchange", Science, v234, p167(7), Oct. 10, 1986.*

Walker, Christy, "Chat Servers Onlines Customer Support", PC Week, v15, n23, p29(2), Jun. 8, 1998.*

(List continued on next page.)

*Primary Examiner*—Frantzy Poinvil
*Assistant Examiner*—Nga B. Nguyen (57) ABSTRACT

A system and a method of conducting a time-auction among queuing customers is described. A bid is received from one of the queuing customers and compared with the prices being offered by the other customers waiting in line. If the bid is higher than at least one of the prices, the bidding customer is advanced in line ahead of the customer offering the lower price. The system and method provide a mechanism for customers willing to pay more to advance in the queue and to move ahead of those not willing to pay as much. At the same time, the system and method allow vendors such as service providers, for whose good or services customers are willing to wait in line, to maximize the price charged for their services at any given moment.

33 Claims, 8 Drawing Sheets

U.S. PATENT DOCUMENTS

| | | |
|---|---|---|
| 5,619,148 A | 4/1997 | Sloane |
| 5,619,570 A | 4/1997 | Tsutsui |
| 5,634,012 A | 5/1997 | Stefik et al. ............... 395/239 |
| 5,638,432 A | 6/1997 | Wille et al. ................. 379/121 |
| 5,675,734 A | 10/1997 | Hair |
| 5,694,549 A | 12/1997 | Carlin et al. ............. 395/200.2 |
| 5,710,887 A | 1/1998 | Chelliah et al. ............ 395/226 |
| 5,712,979 A | 1/1998 | Graber et al. .......... 395/200.11 |
| 5,715,314 A | 2/1998 | Payne et al. .................. 380/24 |
| 5,717,860 A | 2/1998 | Graber et al. .......... 395/200.12 |
| 5,718,247 A | 2/1998 | Frankel ...................... 128/898 |
| 5,721,763 A | 2/1998 | Joseph et al. ................. 379/88 |
| 5,722,418 A | 3/1998 | Bro ............................. 128/732 |
| 5,724,424 A | 3/1998 | Gifford ........................ 380/24 |
| 5,734,961 A | 3/1998 | Castille |
| 5,740,231 A | 4/1998 | Cohn et al. .................... 379/89 |
| 5,745,681 A | 4/1998 | Levine et al. ............ 395/200.3 |
| 5,768,521 A | 6/1998 | Dedrick ................. 397/200.54 |
| 5,778,367 A | 7/1998 | Wesinger, Jr. et al. ........ 707/10 |
| 5,794,221 A | 8/1998 | Egendorf ..................... 705/40 |
| 5,809,119 A | 9/1998 | Tonomura et al. .......... 379/112 |
| 5,809,145 A | 9/1998 | Slik et al. |
| 5,812,769 A | 9/1998 | Graber et al. .......... 395/200.12 |
| 5,819,092 A | 10/1998 | Ferguson et al. ........... 395/701 |
| 5,819,267 A | 10/1998 | Uyama ........................... 707/6 |
| 5,819,271 A | 10/1998 | Mahoney et al. .............. 707/9 |
| 5,819,285 A | 10/1998 | Damico et al. ............. 707/104 |
| 5,825,869 A | 10/1998 | Brooks et al. .............. 379/265 |
| 5,825,876 A | 10/1998 | Peterson, Jr. .................. 380/4 |
| 5,832,523 A | 11/1998 | Kanai et al. |
| 5,835,896 A * | 11/1998 | Fisher et al. .................. 705/37 |
| 5,842,212 A | 11/1998 | Ballurio et al. |
| 5,850,433 A | 12/1998 | Rondeau ..................... 379/201 |
| 5,860,068 A | 1/1999 | Cook |
| 5,862,223 A * | 1/1999 | Walker et al. ................ 705/26 |
| 5,864,871 A | 1/1999 | Kitain et al. ................. 707/104 |
| 5,870,744 A | 2/1999 | Sprague ......................... 707/9 |
| 5,878,130 A | 3/1999 | Andrews et al. |
| 5,884,032 A | 3/1999 | Bateman et al. ........ 395/200.34 |
| 5,884,272 A | 3/1999 | Walker et al. ................. 705/1 |
| 5,884,282 A | 3/1999 | Robinson ..................... 705/27 |
| 5,893,077 A | 4/1999 | Griffin .......................... 705/34 |
| 5,907,677 A | 5/1999 | Glenn et al. ........... 395/200.36 |
| 5,911,132 A | 6/1999 | Sloane |
| 5,914,951 A | 6/1999 | Bentley et al. ............. 370/352 |
| 5,924,082 A * | 7/1999 | Silverman et al. ............ 705/37 |
| 5,940,471 A | 8/1999 | Homayoun ..................... 379/1 |
| 5,974,141 A | 10/1999 | Saito |
| 5,982,863 A | 11/1999 | Smiley et al. ............... 379/112 |
| 5,987,430 A | 11/1999 | Van Horne et al. |
| 5,991,394 A | 11/1999 | Dezonno et al. ............ 379/265 |
| 5,999,609 A | 12/1999 | Nishimura |
| 6,014,644 A * | 1/2000 | Erickson ...................... 705/37 |
| 6,026,148 A | 2/2000 | Dworkin et al. ......... 379/88.18 |
| 6,026,400 A | 2/2000 | Suzuki |
| 6,029,141 A | 2/2000 | Bezos et al. |
| 6,035,021 A * | 3/2000 | Katz ........................ 379/93.12 |
| 6,046,762 A | 4/2000 | Sonesh et al. |
| 6,055,513 A | 4/2000 | Katz et al. |
| 6,058,379 A * | 5/2000 | Odom et al. .................. 705/37 |
| 6,064,978 A | 5/2000 | Gardener et al. |

OTHER PUBLICATIONS

"FaceTime Communications Delivers World's First Internet Service Suite For Online Customer Care", PR Newswire Association, Inc., Mar. 29, 1999.*

Walker, Christy, "Customer service get real", PC Week, v15, n9, p32(1), Mar. 2, 1998.*

"NTIA, CalTech Provide Live Electronic Auction Demonstration", PCS News, v5, n3, pN/A, Feb. 3, 1994.*

The Voice of Technology, Credit World, pp. 20–23, Jul 1994.

Telecommunications Buyers Guide and Directory, Editor & Publisher, pp 29TC–38TC, Feb. 1994.

Aspect Telecomm: Aspect Integrates the Web into the Call Center, M2 Presswire, Aug. 1996.

Information, Bid and Asked, Forbes, Aug. 20, 1990, 92.

Attachmate Ready to Answer 'Net questions, Network World, Apr. 8, 1996, 37.

US Courts to Launch First Federal 900 Service, Federal Computer Week, Sep. 28, 1992, 8.

Company Devoted to Hot–Line Support, Computer Reseller News, Oct. 21, 1991, 48.

For Telesphere's Clients, Dial '1–900 TUF Luck',Business Week, Sep. 9, 1991, 88.

When Business Plan and real World Clash, Wall Street Journal, Jun. 9, 1999, B1.

Hidden Cost of Tech Support, PC World, May 1995, 143.

NetBazaar: Networked Electronic Markets for Trading Computation and Information Services, ECDL 1998—Research and Advanced Technology for Digital Libraries, 839.

Multimedia Collaborative Remote Consultation Tools via Gigabit WAN in Teleradiology, IEEE 1994 Phoenix, 417.

Multimedia Communication in a Medical Environment, IEEE 1991 Singapore I.C. on Networks, 166.

A New Teleconsultation Terminal System Using ISDN, NTT Review, Jul. 1991, 37.

MiniPay: Charging Per Click on the Web, CNISDN, 1997 v29, 939.

Caring for Customers: Real–time text chat and telephony provide personalized customer support and turn queries into sales leads, Internet World Media, Sep. 1999.

Kiyoshi, Kabeya, Akihiro Tomihisa and Sueharu Miyahara, "A New Teleconsultation Terminal System Using ISDN," NTT Review, vol. 3, No. 4, Jul. 1991, pp. 37–43.

Masahiko Hase, Shuji Kawakubo and Mineo Shoman, "Advanced Videophone System Using Synchronized Video Filing Equipment," NTT Review, vol. 3, No. 4 Jul. 1991, pp. 29–36.

Franco Mercalli and Roberto Negrini, "The ESSAI Teleshopping System: An Example of a Broadband Multimedia Application," IEEE, 1994, pp. 572–576.

Abhaya Asthana and Paul Krzyzanowski,"A Small Domain Communications System for Personalized Shopping Assistance," IEEE, 1994, pp. 199–203.

Linda Littleton, "Meet the Shadowy Future," Proceedings ACM SIGUCCS User Services Conference XXII, Ypsilanti, Michigan Oct. 16–19, 1994, pp. 205–210.

L. F. Ludwig and D.F. Dunn, "Laboratory for Emulation and Study of Integrated and Coordinated Media Communication," Conference on Office Information Systems, Mar. 23–25, 1988, Sponsored by ACM SIGOIS and IEEECS TC–OA in cooperation with IFIP W.G. 8.4, pp. 283–291.

E.J. Addeo, A.B. Dayao, A.D. Gelman and V.F. Massa, "An Experimental Multi–Media Bridging System," Frontiers in Computer Communications Technology, Computer Communications Review, vol. 17, No. 5, Aug. 11–13, 1987, pp. 236–242.

ISDN Tutorial:Definitions, http://www.ralphb.net/ISDN/defs.html, printed on Apr. 21, 2000.

ISDN Tutorial: Interfaces, http://www.ralphb.net/ISDN/ifaces.html, printed on Apr. 21, 2000.

"USA Global Link Brings Interactively to Internet Shopping", Business Wire., 10/98.

"Lucent Technology and Netscape Team to Deliver Lucent Ecommerce Solutions", Business Wire, 9/98.

"TriNet's Help Me, I'm Stuck, Internet Voice Button Services Pushes Web Pages to Online Users", Business Wire, 3/98.

Tehrani, Rich, "e–Rip Van Winkle and the 60 second Nap", Call Center Solution, vol. 18, No. 2, pp. 16(3)., 8/99.

"Netcall Internet Call Buttons Enhance E–Commerce Customer Service and Sales", PR Newswire, p. 7431., 8/99.

"Connecting to On–Line Car Shoppers: Auto Sellers Use Netcall Internet Call–Button Technology to Turn Clicks into Interactive Sales", Business Wire, p. 4089., 7/99.

Davey, Tom, "Wheeling and Dealing Online", PC Week, vol. 13, No. 45, pp. 1, 129., 11/96.

Collett, Stacey & Julie King, "Why Online Browsers Don't Become Buyers", Computerworld, vol. 33, No. 48, p. 14.

Information about Expertcity.com retrieved from the Internet [URL: http://www.expertcity.com]on Nov. 6, 2000.

"Rent–An Expert On the Web", Information Week, p. 75, 9.99.

"Expercity.com Launches Premier Online Marketplace for Expert Services", PR Newswire, 8/99.

Information about keen.com retrieved form the Internet [URL: http://www.keen.com], on Oct. 24, 2000.

Cynthia Hodgson, "Online Expert Databases & Services", Econtent, Dec. 1999, p. 48–53.

Jeff Peline, "Net Firm to Connect Users by phone", CNET News.com, retrieved from http://news.cnet.com on Oct. 24, 2001.

"Keen.Com Launches First Live Answer Community", Press release retrieved from http://www.keen.com on Oct. 24, 2000.

John Healey, "From A–Z, "You Can Sell Advice Online", Mercury News retrieved from "http://www0.mercurycenter.com on Oct. 24, 2001.

Joseph Menn, "An Expert? There's Now a Home for You on the Internet", Los Angeles Times retrieved from http://www.denverpost.com on Oct. 24, 2001.

"Walker Digital Issued Landmark U.S. patent application No. 5,862,223 for Global Internet Marketplace for Experts", Business Wire, Jan. 26, 1999.

Qcircuit Web Site (www.qcircuit.com).

Infomarkets.com Web Site (www.infomarkets.com).

Intellect Exchange Web Site (www.intellectexchange.com).

Answers.com Web Page (www.answers.com).

Chris Ott, "Making Good on the Information Economy", Denver Business Journal, Dec. 17, 1999, p. 27.

Michael Rogers et al, "Experts abound at New Web Sites", Library Journal, Mar. 1, 2000, pp. 22–24.

"Surfbrains.com: Brains online save time & money", M2 Presswire, Jul. 11, 2000.

Michael Kanellos, "Do You Want To Know The Meaning Of Life?", Computer Reseller News, Mar. 3, 1997, pp. 72–74.

"Applying Technology News", Accounting Technology, Feb./Mar. 1997, p. 14.

Ellen Greenblatt, "Have you ever wondered . . . ", Datamation, Oct. 1997, p. 126.

Kiyoshi Kabeya et al, "A new teleconsultation Terminal System Using ISDN", NTT Review, Jul. 1991, pp. 37–43.

"Information for sale: Commercial Digital Reference and AskA Services", Virtual Reference Desk, Sep. 30, 1999, at www.vrd.org/AskA/commAskA.html.

EXP.com Web Site at www.exp.com/.

The Web Site at www.experts–exchange,com/.

Electronic Emissary at www.tapr.org/emissary/.

The Web Site at www.allexperts.com/.

* cited by examiner

Keen.com is calling your phone right now.

If you use the same line to go online and to make phone calls, please hang up your online connection now.

When you answer, please press 1 on your touch-tone keypad to accept.

FIG. 8

SYSTEM AND METHOD FOR CONDUCTING A TIME AUCTION

This application is related to co-pending application U.S. application Ser. No. 09/414,710 filed on Oct. 8, 1999, the entire contents of which are incorporated by reference herein.

The present invention relates generally to electronic commerce using digital and analog networks. More specifically, the present invention relates to a network application for conducting a time auction among customers in a queue to advance a customer willing to pay more to receive services ahead of other customers who are not willing to pay as much.

BACKGROUND OF THE INVENTION

Consumers interested in acquiring services must first identify the service provider who is capable of providing the required services. At present, this usually means perusing a telephone directory, which can become frustrating and time-consuming if the service providers telephoned are not immediately available. A phone book (whether a bound paper book or an electronic directory) is also not very effective if the service provider's business category is not known.

Over the years, a number of systems have been developed that partially address this problem. In particular, these include systems that attempt to match potential customers with potential service providers. They range from free bulletin-board-style Internet web sites to sophisticated Internet-based consulting services.

Once a service provider has been identified and has agreed to provide the requested services to the user, the service provider may wish to charge the user for providing the requested services. In many cases, the service provider will charge the user based upon the time it takes to provide the requested services.

Currently, providers of services use rigid methods to bill their time for services rendered to clients. Lawyers and consultants, for instance, set a fixed hourly rate. After tallying the amount of time worked, they bill their clients according to this preestablished rate. This process offers little flexibility to alter the fixed hourly rate, and the service provider must painstakingly tally the time.

Some devices exist to automate the billing of time for services rendered. 1-900 telephone numbers, for instance, automatically calculate the time that services are rendered through the telephone and bill the customer accordingly.

None of these present-day devices, however, provides a method by which the service provider's billing rate can be maximized in real time. 1-900 numbers have a fixed rate that is advertised to the customer. The service provider bills at this rate and at this rate only—even if there are 50 customers vying to speak to the same provider at once.

This rigidity is unfortunate, since a service provider's time is more valuable at some moments than at others. For example, when 50 customers all would like to speak to the same service provider at a given moment, that service provider's time is clearly more valuable than his or her rate indicates, since demand for that time at the given rate far outweighs the supply. Additionally, some customers may value their time more than others and be willing to pay more to not have to wait to speak with the service provider. Current systems provide no way for either the service provider or the customer to maximize the value of their time.

SUMMARY OF THE INVENTION

A system and method for allowing a first user to advance in a queue having at least a second user are described. The first user and the second user each have separate positions in the queue. The system includes a first logic unit to receive a bid from the first user. A second logic unit compares the bid with a price being offered by the second user. If the bid is higher than the price, a third logic unit advances the first user to a subsequent position in the queue ahead of the position associated with the second user. From the detailed description that follows, it will be clear that a "first user" and a "second user" may be part of a plurality of more than two users waiting in a queue.

The systems and methods described herein may be incorporated into a "service marketplace" system that matches users with potential information or service providers and establishes a real-time communications connection between the user and a selected information provider such that the user and the information provider may communicate with each other in real-time.

DETAILED DESCRIPTION OF THE INVENTION

The present invention enables customers to advance ahead of other waiting customers and receive services from a particular information or service provider ahead of those who are not willing to pay as much for the services. The present invention also enables service providers to maximize the rate they charge at any given moment. The systems and methods of the present invention may be incorporated as part of a network application that establishes a real-time communications connection between an information provider and a customer or user through a communications network, such as telephone network, a computer network, wireless communications network, etc.

In one embodiment, the system of the present invention establishes a web site through which a user can monitor his or her relative position and progress in the queue as well as bid to advance his or her relative position in the queue. In another embodiment, a system establishes a telephone connection over which the user is notified of his or her relative position in the queue and can submit bids to advance in the queue. The systems and methods of the present invention may be implemented with other communication networks, such as a satellite network, a direct TV network, a wireless communications network, etc.

Figure 1:
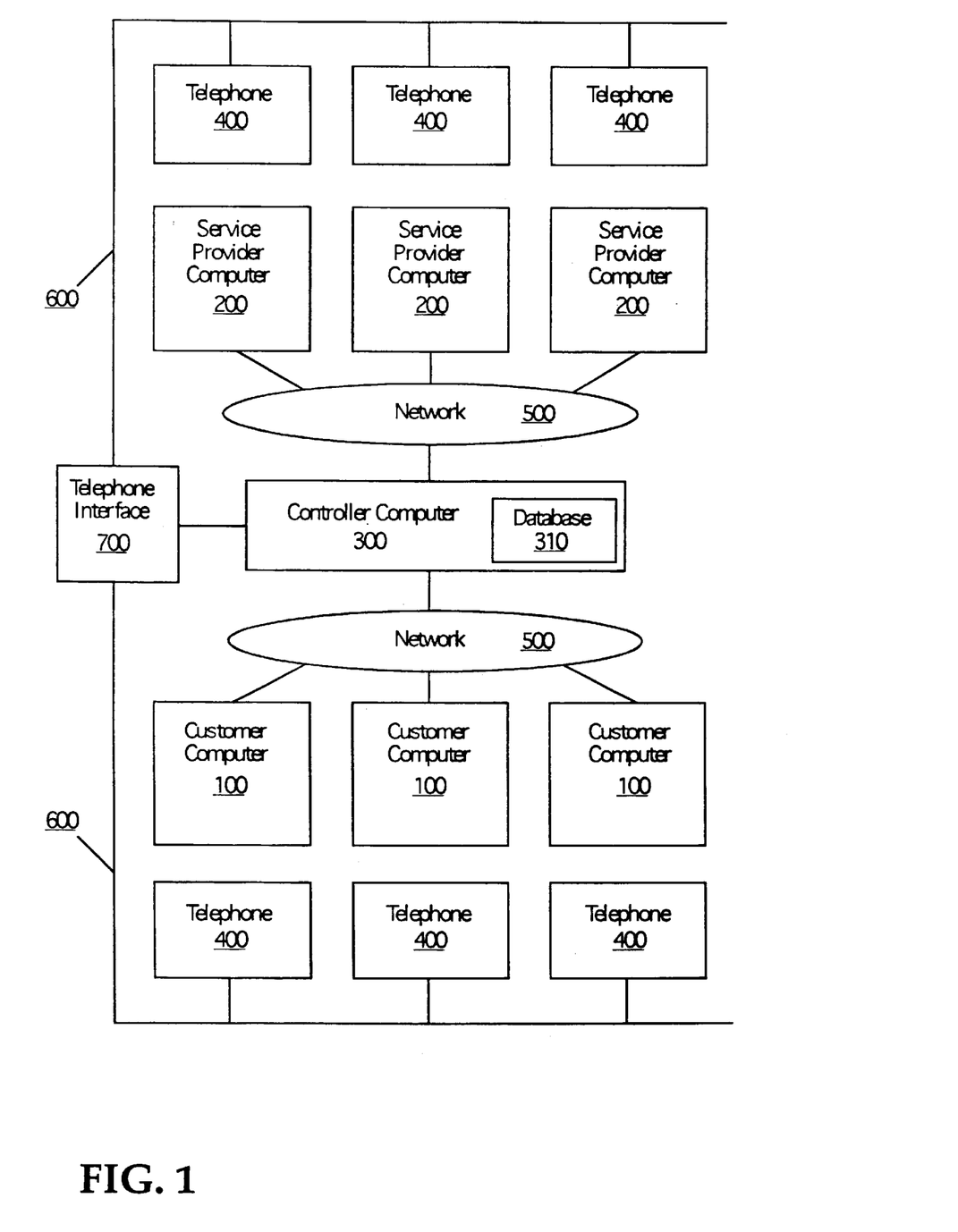
FIG. 1 illustrates a system for identifying information providers and connecting customers with information providers in accordance with one embodiment of the invention.
Figure 2:
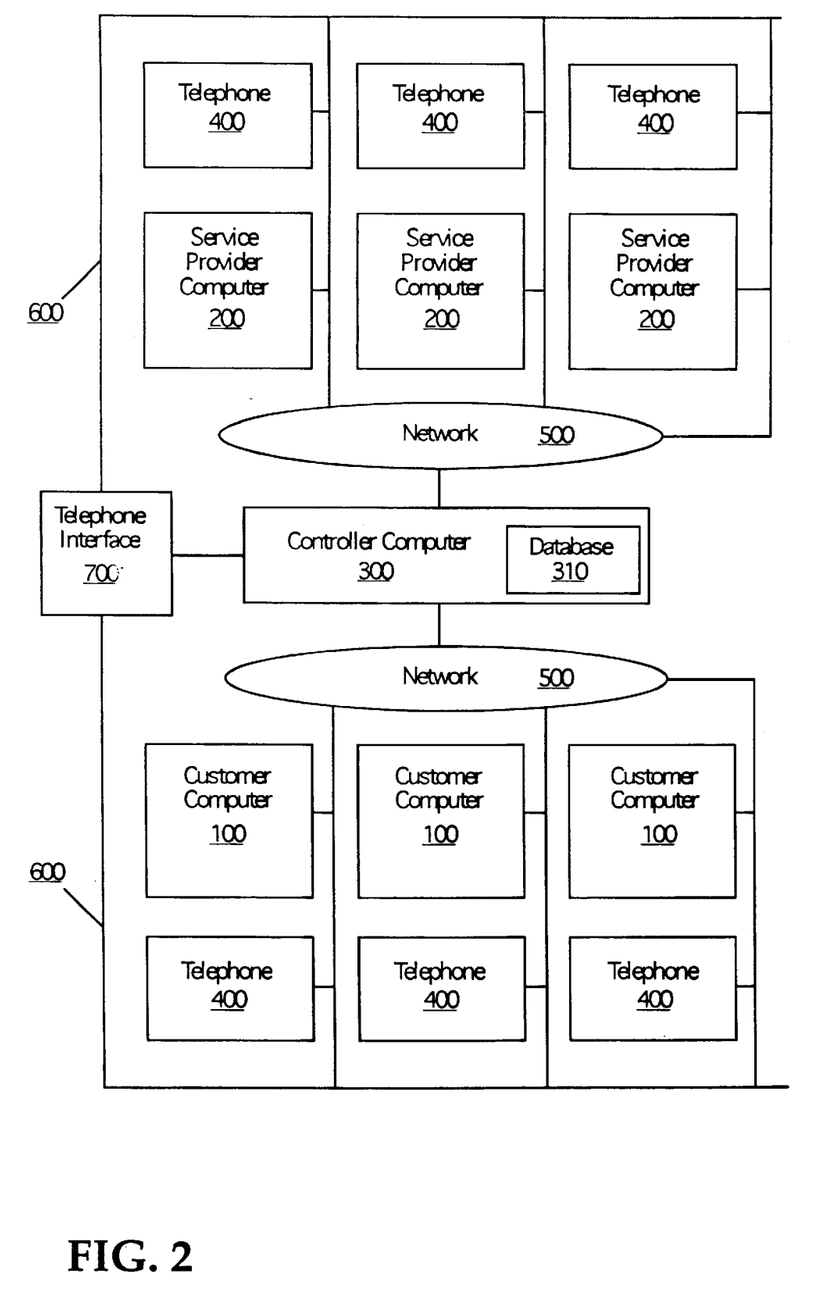
FIG. 2 illustrates an alternative embodiment of the system for identifying information providers and connecting customers with information providers.

FIG. 1 shows one embodiment of a system in which the systems and methods of the present invention may be incorporated. User computers ("customer computers") 100 and information provider computers ("service provider computers") 200 are connected through a network 500 (such as the Internet) to a host computer or web server ("controller computer") 300. Persons skilled in the art will recognize that said controller computer 300 may consist of more than one computer working together to provide the controller computer functions described herein. The users (customers) and information providers (service providers) each have telephones 400 that are connected to the telephone network 600. In FIG. 1, the computer network 500 and telephone network 600 are shown as two separate entities, though persons skilled in the art will realize that they can overlap. See FIG. 2.

The controller computer 300 has the functionality of a standard web server, capable of interacting dynamically via the service provider computers 200 and the customer computers 100 with service providers and customers, respectively. In addition to the standard web server operation, the controller computer 300 is linked to a telephone interface 700 that enables the controller computer 300 to set up, initiate, confirm, and track conversations between the customers and service providers. The controller computer 300 has the ability to establish a real-time communications connection between service providers and customers for the purpose of conveying information in real-time in an interactive manner.

In accordance with the embodiment shown in FIG. 1, the customer computers 100 and the service provider computers 200 are connected to the controller computer 300 through the network 500. Customers and service providers use their computers to connect to the Internet network 500. Once a connection has been established, service providers and customers will enter the URL, or Internet address, of the controller computer 300, and a logic unit within the controller computer establishes a computer connection with the customer computer 100 and the service provider computer 200. In one embodiment, after the computer connection has been established between the controller computer 300 and the service provider and customer computers, 200 and 100, respectively, a logic unit within the controller computer presents a web page on the service provider and customer computers.

Typically, customers and service providers register before customers can purchase services or information and before service providers can offer their services or information through the web site. During registration, the customers and the service providers are requested to submit certain information, such as a username and password. Customers may be requested to submit credit card or other financial information. Service providers may or may not be requested to submit credit card or other financial information. Once the requested information has been submitted, the data is stored in the database 310 in an account set up for the service provider and in a user account set up for the customer.

A logic unit within the controller computer 300 may present a web page on the customer computer 100 and the service provider computer 200 through which the logic unit prompts the customer and the service provider to submit the requested registration information. The logic unit is linked with the database 310 and so automatically sets up the account and the user account and automatically stores the submitted registration information in the appropriate accounts on the database 310.

Service providers typically submit a description or a listing for each service they will provide through the web site. After the description or listing has been stored by the controller computer 300, the service described may be offered to all of the users who browse the web site. Access to the web site may be established as described above, with the customer using a user computer ("customer computer") 100 to connect to a network 500 and then entering the LURL of the controller computer 300. A logic unit within the controller computer 300 then establishes a computer connection with the customer computer 100.

After the computer connection has been established, in one embodiment customers will have the option of executing a keyword search for service providers. The keyword search can be executed from a web page presented by a logic unit of the controller computer 300 on the customer computer 100. A keyword search typically consists of scanning a database for words that match the keywords entered. In this embodiment, the keyword search will be executed against the stored descriptions and listing data. In one embodiment, customers will view a list of service providers matching the keyword search criteria on a web page presented by the logic unit on the customer computer. Customers will have the option of viewing the service providers listed according to price, availability, or customer evaluations in either ascending or descending order, though the service providers can be listed in any number of ways. As an alternative to a keyword search, customers can select a category to view a predetermined list of service providers.

Figure 3:
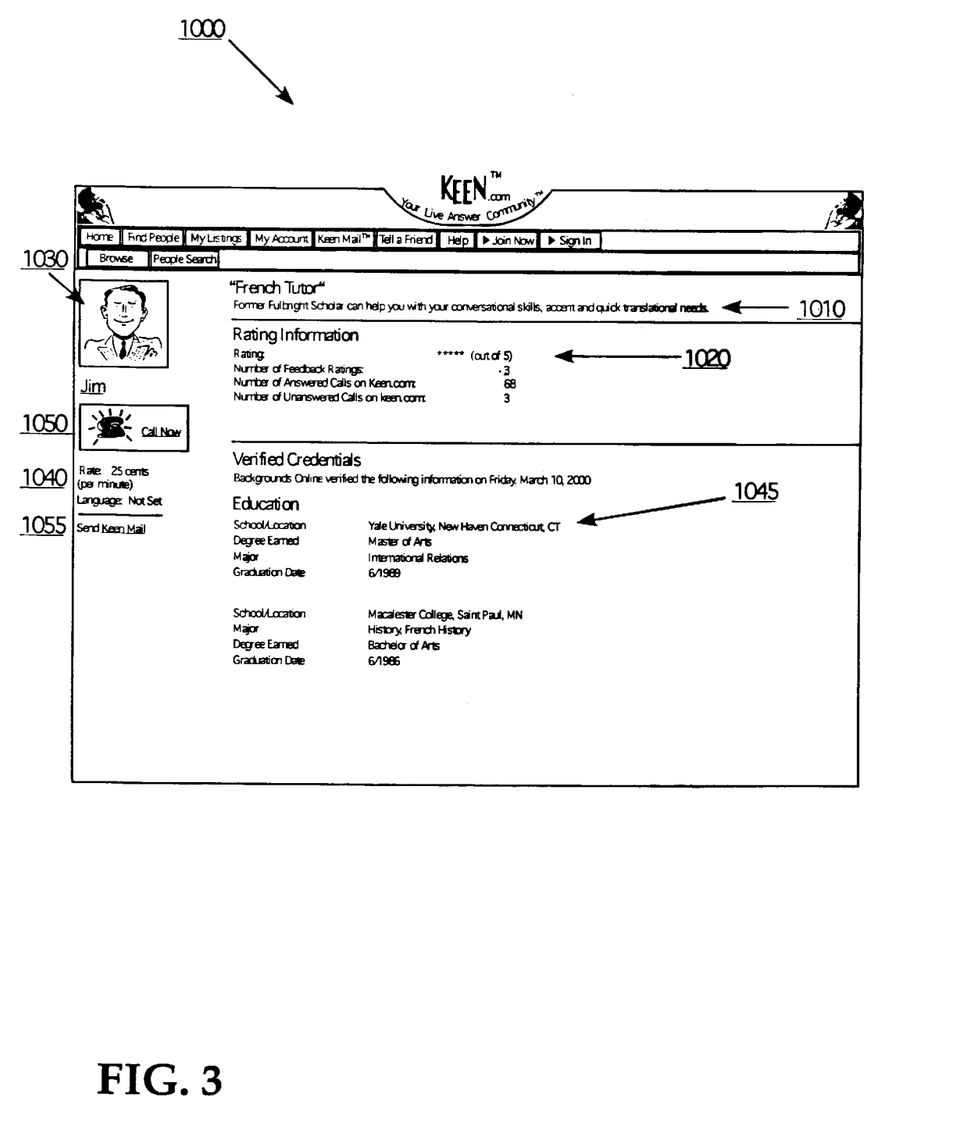
FIG. 3 illustrates one embodiment of an information provider's listing page on which potential users can read a description of the information provider and see a rate the information provider charges to communicate.

In one embodiment, a logic unit within the systems presents, in response to a customer selection of a service provider from the list, a listing page that contains additional information about the selected service provider and the selected information service. FIG. 3 illustrates one embodiment of a listing page that provides more detailed information about a service provider that goes by the name of Jim. The listing page 1000 shown in FIG. 3 provides a brief description the information services provided 1010 and may also include rating information 1020, a picture of the service provider 1030, a rate or price per minute 1040, as well as other information that the potential customer may find helpful such as the education background of the service provider 1045. The listing page 1000 may also include hyperlinks that enable the customer to call 1050 or email 1055 the service provider. The information provided in a listing page may be conveyed in other forms, e.g., instead of a picture or photo 1030 the service provider may choose to be represented with an avatar or other information-rich graphic, and may include other types of information in addition or instead of the information shown in the embodiment of FIG. 3.

When a customer decides to receive information or services from the service provider, the customer may request to have a real-time communications connection established with the service provider. For example, from the listing page illustrated in FIG. 3, a customer may click on the "Call Now" hyperlink 1050 to send such a request and, in response, a logic unit within the system attempts to establish a real-time communications connection between the customer and the service provider.

In some cases, the service provider may already be providing services to another customer when the controller computer receives a request to establish a real-time communications connection, e.g., by clicking on the "Call Now" hyperlink 1050. Additionally, other customers may already be waiting to communicate with the service provider. In such a case, a logic unit within the system will organize a queue for all of the service provider's waiting customers. Each of the waiting customers is assigned a position in the queue. In general, the queue is organized in order of when the request to connect with the service provider was received by the controller computer. When the logic unit receives a request to establish a real-time communications connection from a customer, that customer is initially assigned a position at the end of the queue. Ordinarily, it is assumed that the customer will initially offer a price equal to the service provider's published rate. However, in some embodiments, the customer may offer a different price along with the request to connect with the service provider.

Figure 4:
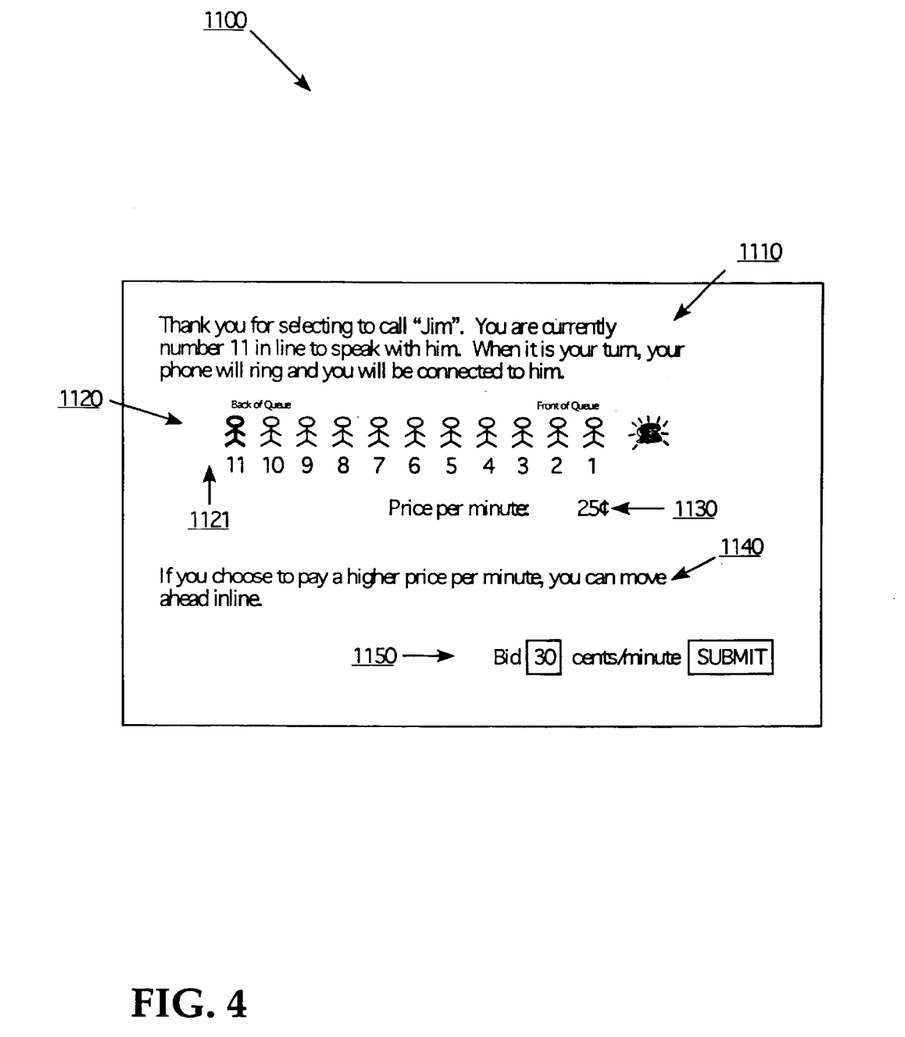
FIG. 4 illustrates one embodiment of a queuing page, which appears after a user has chosen to connect with an information provider and on which the user can see his or her position in the queue and is given an opportunity to improve this position by offering to pay a higher rate.

In one embodiment, the logic unit will present to the customer a queuing page, such as the one illustrated in FIG. 4. The queuing page 1100 displays an acknowledgment message 1110, thanking the customer for selecting to call the service provider and informing the customer with what position in the queue the customer has been associated. The queuing page 1100 may include a graphical representation of the customer's position 1121 in the queue 1120 and display a price offered by the other customers 1130 to receive services from the selected service provider.

As shown in FIG. 4, each customer is offering the same price, in this case a price equal to the service provider's published rate. In other words, none of the queuing customers yet have bid to advance ahead of another in the queue. This need not always be the case when a customer first joins the queue, or is first assigned a position in the queue. In some cases, when a customer first joins the queue, a plurality of prices may be offered by those already in the queue. In such cases, the queue is organized primarily in order of descending price. For customers offering the same price, each customer is assigned a position in order of when the request to connect was received from that customer.

As mentioned above, when a customer first joins the queue, the customer ordinarily is assumed to offer a price equal to the service provider's published price and is assigned a position at the end of the queue. In some embodiments, however, where the customer offers a different price before or as he or she joins the queue, the customer is assigned a position in the queue according to how much the customer is offering relative to the price or prices currently being offered by the already queuing customers.

In addition to informing the customer of his or her position in the queue and the price or prices being offered by other customers waiting to communicate with the information service provider, a system of the present invention is configured to receive a bid from the customer. In one embodiment, and as shown as part of the queuing page depicted in FIG. 4, a logic unit within the system informs the customer of the opportunity to move his or her position ahead in line 1140 and provides a bid 1150 for the customer to accept. The bid typically is higher than the prices being offered by each of the other customers, but may be higher than only one or some of the prices being offered by the other customers.

Also, instead of providing a bid and prompting the customer to accept the bid, the system may be configured to allow the customer to enter a bid of his or her own choosing.

Figure 5:
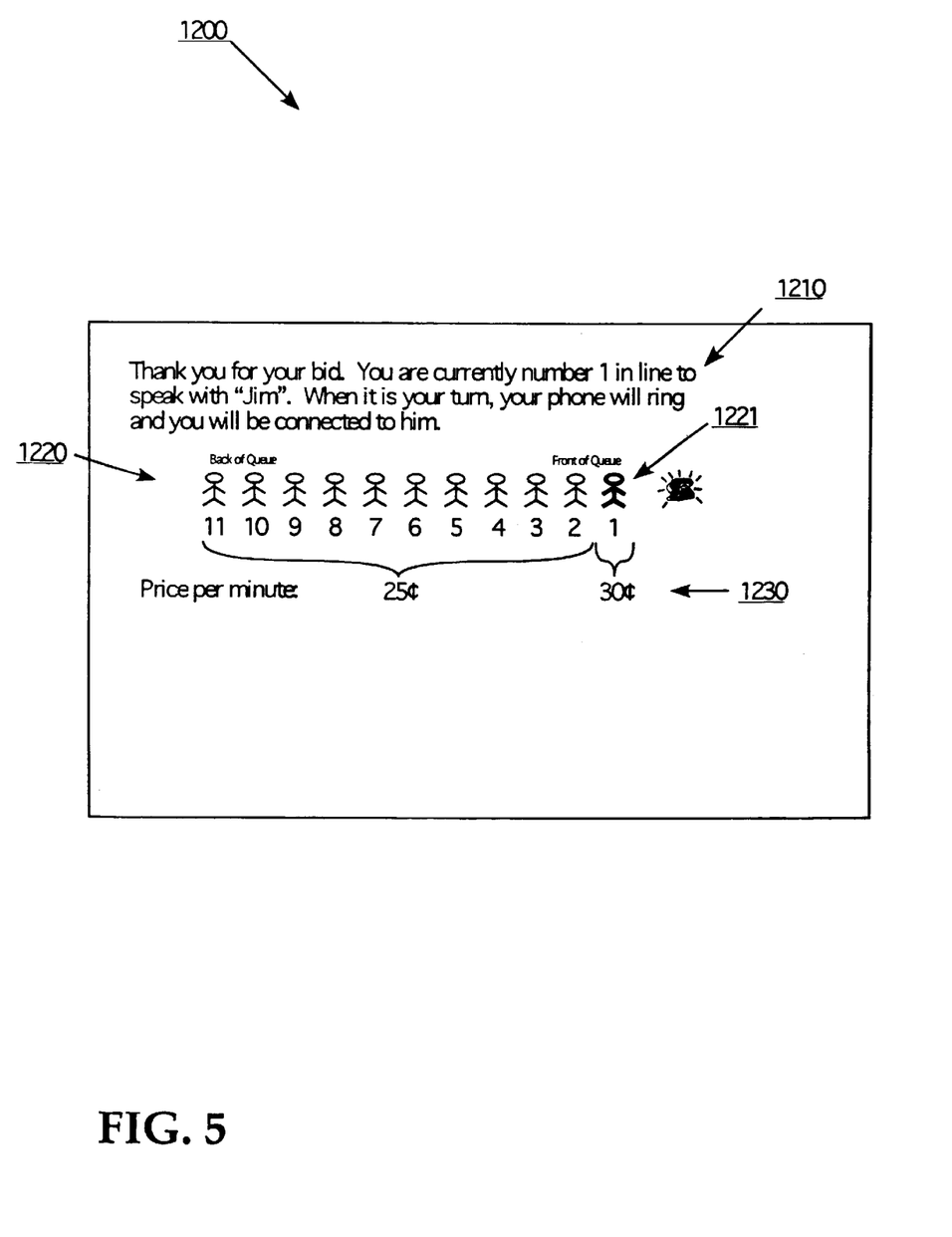
FIG. 5 illustrates one embodiment of a queuing page showing the user's updated position in the queue due to having bid a higher rate to receive services from the information provider.

Once the system has received a bid, a logic unit within the system compares the bid with the prices being offered by the other customers. If the bid is higher than at least one of the prices, a logic unit within the system will advance the customer ahead of those customers whose price is lower than the bid. In one embodiment, the system updates the queuing page, as shown in FIG. 5. The queuing page 1200 shown in FIG. 5 includes an acknowledgement message 1210, thanking the customer for the bid and informing the customer of his or her new position in the queue. The queuing page 1200 additionally, or alternatively, includes a graphical depiction of the queue 1220 and of the customer's current position at the head of the queue 1221, as well as the prices currently being offered by each of the customers in the queue 1230.

Figure 6:
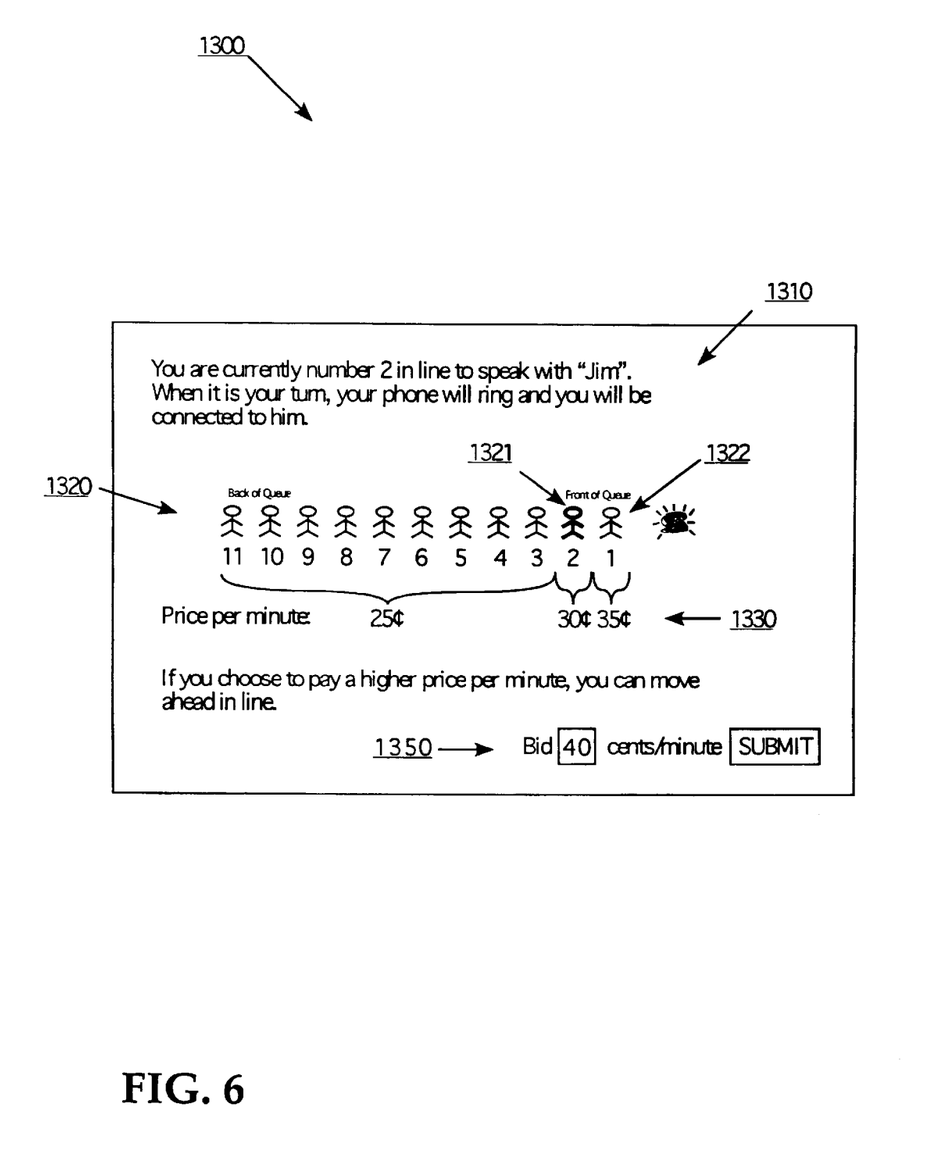
FIG. 6 illustrates one embodiment of a queuing page showing how the user's updated position has been superseded by another user, who bid an even higher rate to connect with the information provider, and again providing the user an opportunity to improve his or her position by offering to pay a still higher rate.

The system typically relays the bidding and queuing activity in real-time to each of the customers waiting in the queue. Thus, the controller computer may subsequently receive a second bid from a second customer and advance the second customer ahead of the previous customer. Each time a bid is received, the system reorganizes the queue in descending order of the current prices being offered and, for customers offering the same price, in order of when the request to connect with the service provider was received. The controller computer then informs each of the customers waiting in the queue of his or her current position. In one embodiment, after each bid is received, a logic unit within the system updates the queuing page 1300 with information about the customer's current position in the queue 1310 as shown in FIG. 6. This information may additionally or alternatively be presented to the customer in a graphical depiction of the queue 1320 showing the second customer at the head of the line 1322, the second customer's position having been advanced ahead of the previous customer 1321. The updated queuing page 1300 also shows the prices currently being offered by each of the customers in the queue 1330. The system offers the customer a chance to advance again by submitting a still higherbid 1350.

Figure 7:
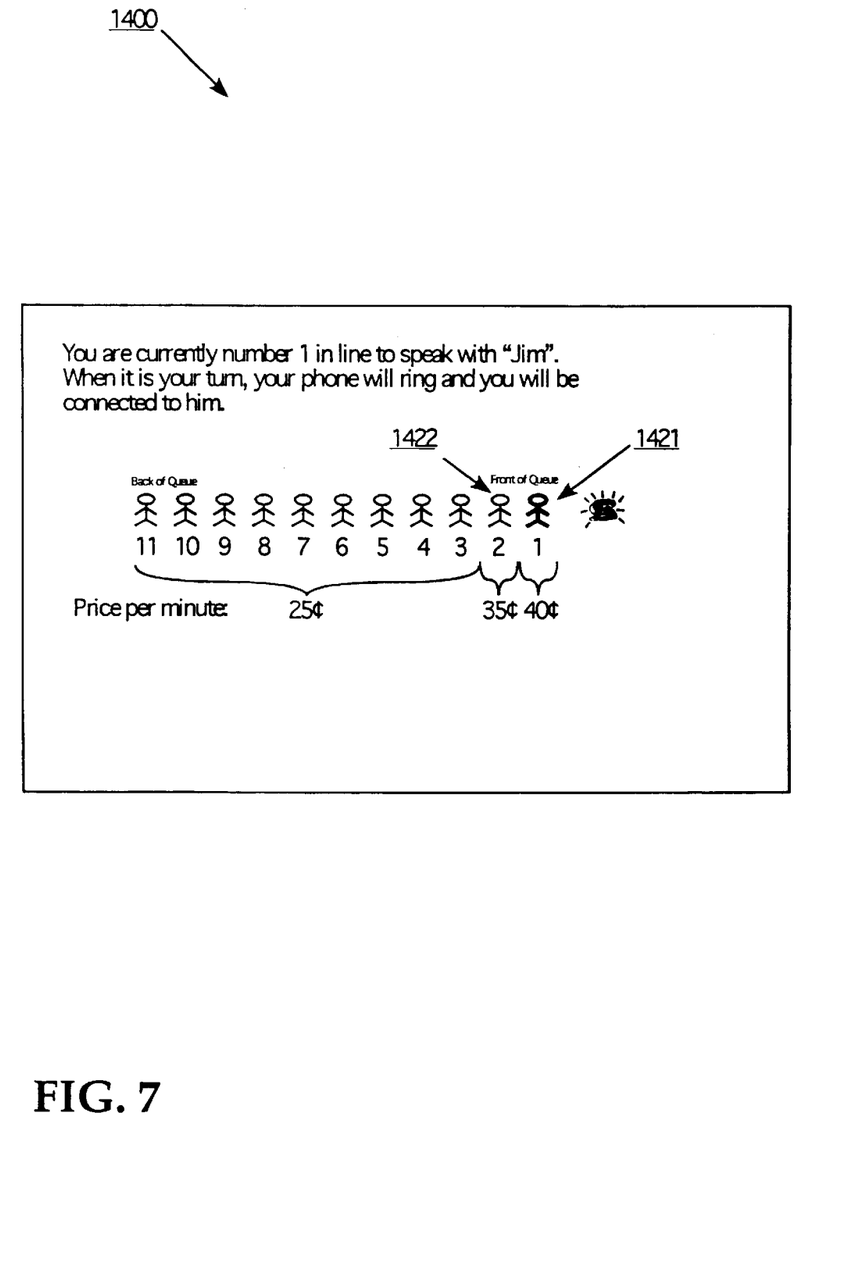
FIG. 7 illustrates one embodiment of a queuing page showing how the user has once again advanced his or her position in the queue by bidding a still higher amount.

In this embodiment, when a still higher bid is received by the controller computer, the queuing page is again updated, as shown in FIG. 7. The newly updated queuing page 1400 shows the customer that was associated previously with the number-2 position in the queue (see FIG. 6) now occupying a position at the head of the queue 1421, having been advanced ahead of the second customer 1422 as a result of submitting a higher bid.

This bidding process may continue as described above, with customers offering higher bids and advancing ahead of one another as a result. When the service provider becomes available to provide services to the next customer, a logic unit within the system will establish a real-time communications connection between the customer associated with the number-1 position in the queue at that time. The real-time communications connection may be established over a telephone network, a computer network, satellite network, wireless communications network, direct TV network, or other type of communications network, and may include an audio connection, video connection, or other type of voice or data connection. The customer in the number-1 position at the time the service provider becomes available, in effect, has won the time auction by offering to pay the highest price to receive the service provider's services ahead of all other customers in the queue. The customer is billed at the highest bid price for the services received from the service provider.

Figure 8:
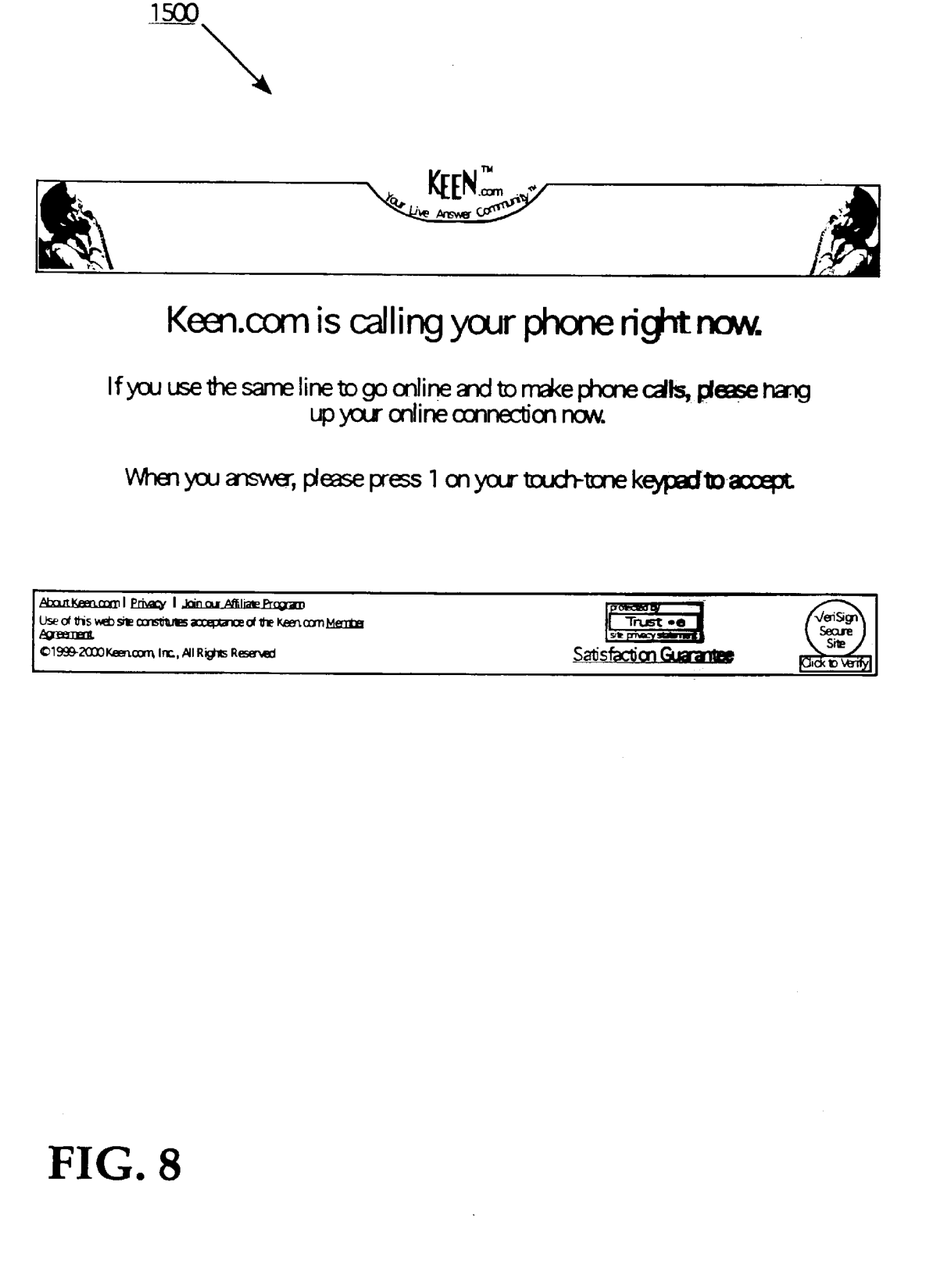
FIG. 8 illustrates one embodiment of a web page shown to the user that has effectively won the time auction.

In one embodiment, a logic computer within the system presents a web page, such as the one depicted in FIG. 8, to the customer at the head of the queue at the time the service provider becomes available to help the next customer. The web page 1500 informs the customer in the number-1 position in the queue that the real-time communications connection is being established and may, if necessary, provide instructions to establish the communications connection.

Among the customers still waiting in the queue when the next customer has been connected with the service provider, the bidding process may continue. In one embodiment, the system updates the queuing page when the customer in the number-1 position has been connected to the service provider, and presents the updated queuing page to those customers still waiting. The customer that was in the number-2 position is now shown in the number-1 position, and that customer's bid is now the highest bid currently being offered. If no other bids are received, that customer will be next to communicate with the service provider. Other customers in the queue may bid a higher amount, as described above, to advance to the number-1 position. Alternatively, other customers may bid an amount higher than at least one other waiting customer to advance ahead of at least that one other customer, though not necessarily to the number-1 position.

The systems and methods of the present invention have been described above in terms of a "service-marketplace" system in which customers are waiting to receive information services in real-time from a service provider over a communications network. Such a system is described in detail in co-pending U.S. application Ser. No. 09/414,710, which is incorporated herein by reference. When implemented with such systems, several of the queuing and time auction functions described above may be performed by the controller computer 300 (see FIG. 1 and FIG. 2). However, it should be noted the systems and methods of the present invention may be incorporated into other systems in which users are forced to wait in a queue.

A system according to the present invention may provide all or some of the above queuing and time auction features using other communications means, such as via e-mail, or over a telephone network, a computer network, a satellite network, a wireless communications network, a direct TV network, etc. For example, the customer may be informed over a telephone connection of his current position in the queue and of a price being offered by other customers in the queue. Additionally, the system may receive a bid over the telephone connection via the telephone keypad or with voice-recognition software. Similarly, a time-auctioning method of the present invention is not limited to the systems described above and may be implemented using other communications means.

EXAMPLE

A service provider named Wendy, an astrologer, provides astrological predictions for her customers at 99 cents per minute through a service-marketplace web site. Customers who wish to speak with her click on a "Call Now" button on the web site, which establishes a telephone connection between the customer and Wendy. The call is billed to the customer at 99 cents per minute for the duration of the call. Wendy's business volume is moderate most of the time, but whenever there is a tumultuous news story, such as an earthquake or plane crash, her volume increases dramatically as customers flood to her services.

Wendy is currently on the phone with a customer, yet other customers, including one named Dan, wish to speak with her as well. These customers, Dan included, are therefore placed into a queue. On the web page he can see that he is number-11 in the queue. The web site also gives Dan the opportunity to improve his position in the queue by offering to pay her a rate higher than 99 cents per minute.

Dan offers to pay Wendy a rate $1.09 per minute. This is a higher rate than the 99 cents per minute that the rest of the customers are prepared to pay. Therefore, Dan's position in the queue moves from number-11 to number 1, and he is next in line to speak to Wendy.

Subsequently, another customer in the queue, named Albert, offers to pay Wendy a rate of $1.19 per minute. Albert's position in the queue therefore moves to the number-1 position, since it is higher than the $1.09 rate that Dan is willing to pay. Dan therefore moves to the number-2 position.

Dan, however, is intent to speak to Wendy now. He therefore bids a still-higher rate, $1.29 per minute. Since this is higher than the $1.19 rate that Albert is willing to pay, Dan moves back into the number-1 position in the queue. Albert moves to the number-2 spot. Albert is unwilling to raise his bid above Dan's and therefore remains in the number-2 position.

Dan, holding the number-1 position in the queue, has effectively won the "time auction." Wendy finishes her conversation with the customer she was helping and is connected to the number-1 person in the queue, who is Dan. For the duration of the call, Dan is billed at the rate he specified, $1.29 per minute, which is collected by Wendy.

Through this time auction, Wendy maximizes the rate she can collect from her customers at any given moment, and Dan increases the value of his time by reducing the amount of time spent waiting on line.

Those of ordinary skill in the art will recognize that this example and the embodiments described above are illustrative only and do not in any way limit the range of applications of the present invention. Numerous modifications, variations, and improvements may be made to the example and the embodiments described above that still fall within the scope of the invention as claimed.

What is claimed is:

1. A system for establishing a real-time communications connection between a user and a selected information service provider for a live, real-time conversation, the system comprising:
 a communications interface; and
 a controller computer linked with the communications interface, the controller computer having:
  a first logic unit to provide a list of information service providers from a wide array of fields of service to the user;
  a second logic unit, in response to the user selecting the selected information service provider from the list, to assign the user a position in a queue when one or more other users have also selected the selected information service provider, the queue having a plurality of other positions, each occupied by one of the one or more of other users waiting to communicate with the selected information provider;
  a third logic unit to receive a bid from the user when the user desires to advance position within the queue;
  a fourth logic unit to compare the bid with each price being offered by each of the one or more other users, such that each price being offered by each of the one or more other users is initially equal to a price charged by the selected information service provider for providing services in a live, real-time conversation with the user;

a fifth logic unit to advance the user to a position in the queue ahead of each other positions occupied by each other users whose price is lower than the bid; and a sixth logic unit to establish a real-time communications connection via the communications interface between the user and the selected information service provider for the live real time conversation when the user advances to a first position in the queue and the selected information service provider is available to communicate with the user.

2. The system of claim 1, further comprising a seventh logic unit to present a web page to the user.

3. The system of claim 2, wherein the first logic unit provides the list to the user via the web page.

4. The system of claim 2, wherein the third logic unit receives the bid via the web page.

5. The system of claim 2, wherein the web page shows where in the queue the position of the user is currently located.

6. The system of claim 2, wherein the web page shows each price being offered by each of the plurality of other users.

7. The system of claim 1, wherein the third logic unit receives the bid via a voice connection.

8. The system of claim 1, wherein the third logic unit receives the bid via a telephone connection.

9. The system of claim 1, wherein the third logic unit receives the bid via an Internet connection.

10. The system of claim 1, further comprising a seventh logic unit to inform the user of the position in the queue that the user currently occupies.

11. The system of claim 10, wherein the seventh logic unit informs the user via an audio connection.

12. The system of claim 10, wherein the seventh logic unit informs the user via a telephone connection.

13. The system of claim 10, wherein the seventh logic unit informs the user via an Internet connection.

14. The system of claim 1, further comprising a seventh logic unit to inform the user of each price being offered by each of the one or more other users.

15. The system of claim 1, wherein the real-time communications connection comprises a voice connection.

16. The system of claim 1, wherein the real-time communications connection comprises a telephone connection.

17. The system of claim 1, wherein the real-time communications connection comprises an Internet connection.

18. A method of maximizing an amount that an information service provider charges one of a plurality of customers to engage in a live, real-time conversation with the information service provider while waiting in a queue, the method comprising:

informing the plurality of customers of a plurality of positions and a plurality of prices, each of the plurality of positions being occupied by one of the plurality of customers and each of the plurality of prices being offered by one of the plurality of customers waiting to communicate with the information provider;

providing a system generated bid to the plurality of customers, the bid being higher than each of the plurality of prices and higher than a price charged by the selected information service provider for providing services in a live, real-time conversation with the user;

prompting the plurality of customers to accept the system generated bid;

in response to one of the plurality of customers accepting the system generated bid, advancing the position of the one customer ahead of the plurality of positions occupied by others of the plurality of customers; and establishing a real-time communications connection between the information service provider and the one customer when the information service provider becomes available to engage in the live, real-time conversation with the one customer, the one customer being charged an amount equal to the system generated bid for the real-time communications connection with the information service provider.

19. The method of claim 18, wherein the bid is provided to the plurality of customers via an Internet connection.

20. The method of claim 18, wherein the bid is provided to the plurality of customers via a telephone connection.

21. The method of claim 18, wherein the bid is accepted by the one customer via an Internet connection.

22. The method of claim 18, wherein the bid is accepted by the one customer via a telephone connection.

23. The method of claim 18, further comprising presenting a web page to the plurality of customers, the plurality of customers being informed of the plurality of positions and the plurality of prices via the web page.

24. The method of claim 23, wherein the bid is provided via the web page.

25. The method of claim 23, wherein the one customer accepts the bid via the web page.

26. The method of claim 18, wherein the bid is a rate per period of time and the amount the one customer is charged is based upon how long the real-time communications connection is maintained between the information provider and the one customer.

27. A method of conducting a time auction among a plurality of users in a queue waiting to engage in a live, real-time conversation with an information service provider, the method comprising:

receiving a first bid from a first user above a price charged by the selected information service provider for providing services in a live, real-time conversation with the user;

comparing the first bid with a plurality of prices offered by the plurality of users in the queue such that each of the plurality of prices offered by the plurality of users in the queue is initially equal to the price charged by the selected information service provider;

advancing the first user ahead of each of the plurality of users whose price is less than the first bid;

receiving a second bid from a second user;

comparing the second bid with the plurality of prices, including the first bid;

advancing the second user ahead of each of the plurality of users, including the first user, whose price is less than the second bid, such that the queue is re-organized in real-time in response to each bid received; and establishing a real-time communications connection between the information service provider and a user in a first position of the queue customer when the information service provider becomes available to engage in the live, real-time conversation with the user, the user being charged an amount equal to the system generated bid for the real-time communications connection with the information service provider.

28. The method of claim 27, wherein the plurality of users includes a subset of users offering the same price, the subset of users being organized in the queue in order of when each of the subset of users entered the queue.

29. The method of claim 27, further comprising informing a user of the plurality of users of a position occupied by the user in the queue.

30. The method of claim 29, wherein the user is informed of the position in real-time.

31. The method of claim 29, wherein the user is informed of the position each time another user is advanced in the queue.

32. The method of claim 27, further comprising informing a user of each of the plurality of prices offered by each of the plurality of users.

33. The method of claim 32, wherein the plurality of prices is updated each time a bid is received to include the bid.

* * * * *